May 10, 1955        F. HERMAN        2,707,937
BIRD ACTUATED BELL SUPPORT
Filed Feb. 15, 1954
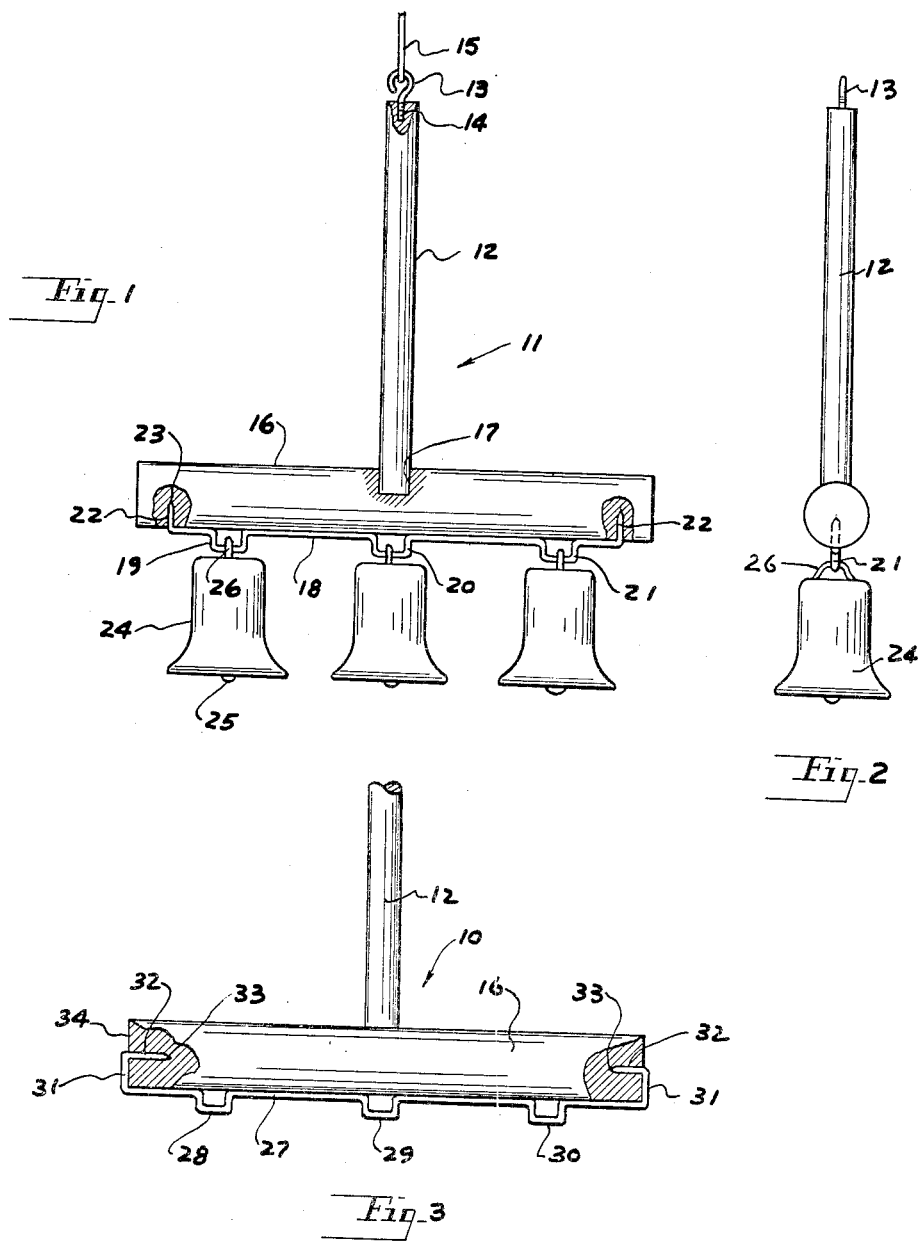
INVENTOR.
FRANCIS HERMAN
BY
ATTORNEY

2,707,937

BIRD ACTUATED BELL SUPPORT

Francis Herman, Detroit, Mich.

Application February 15, 1954, Serial No. 410,391

4 Claims. (Cl. 119—29)

This invention relates to bird cages, and more particularly to a bell carrying swing adapted to be movably suspended within a bird cage.

It is the object of the present invention to provide a novel and simplified bell mounting bracket for such a swing.

It is the further object of the present invention to employ such mounting bracket to thereby minimize the cost and labor of swingably supporting bells from the bird swing.

It is the still further object of the present invention to provide a novel and simplified method of assembling bells and suspending the same from a bird cage swing.

These and other objects will be seen from the following specification and claims, in conjunction with the appended drawing, in which:

Fig. 1 is a side elevational view of the present bird swing, partially broken away and sectioned, for illustration.

Fig. 2 is an end elevational view thereof; and

Fig. 3 is a fragmentary view similar to Fig. 1, illustrating a slightly different form of bell mounting bracket construction.

It will be understood that the above drawing illustrates merely a preferred embodiment of the invention, and that other embodiments are contemplated within the scope of the claims hereafter set forth.

Referring to the drawing, the present swing, generally indicated at 11, is adapted to be swingably suspended upon the interior of a bird cage and is generally of inverted T shape.

The support includes the upright post 12, which carries at its upper end a screw eye 13, secured to the upper end of said post as at 14. Said screw eye is removably suspended from any portion of the bird cage, such as the wire fragmentarily shown at 15.

The support also includes a horizontally disposed rod 16, which is centrally apertured in its upper surface at 17, for receiving and having secured therein the lower end of support post 12.

For the purpose of swingably suspending a plurality of upright bells 24, having upright loops 26 at their upper ends and bell elements 25 therein, there is provided an elongated formed bracket 18.

Said bracket has upwardly extending end portions 22, which are pointed at their outer ends at 23, and are firmly projected up into the horizontally disposed post 16 as shown. The bracket 18 is constructed of a suitable wire or equivalent, and extends along the undersurface of post 16 and has formed therein a series of downwardly extending depressed portions 19, 20 and 21, which in the preferred embodiment are of general U shape.

The loops 26 at the upper ends of the bells 24 are threaded over the ends 22 of bracket 18 and are slid along bracket element 18 until they register within the depressed portions respectively, whereby certain bells are respectively suspended in spaced relation.

This method of mounting the bells is clearly simplified over prior efforts in this direction and requires the minimum amount of time and labor.

A slight variation of bracket formation for mounting said bells is shown in Fig. 3 in the inverted T shape support, generally indicated at 10, and which also has the horizontally disposed post 16 and the central upright post 12, the same as the corresponding post in Fig. 1, and which is adapted for similar suspension.

There is also provided a wire bracket 27, end portions of which project upwardly as at 31 at right angles to the main body of the bracket 27, which main body is adapted to bear against the undersurface of post 16.

The end portions 31 extend along the opposite ends 34 of post 16 as shown in Fig. 3, and each respectively terminates in the aligned opposed inwardly directed end members 32, which are pointed at 33.

End members 32—33 are forcefully projected into the ends 34 of post 16 to thereby illustrate a second method of mounting the bracket 27 to the swing.

It is contemplated that there may be other variations in the method of securing the present bracket within the scope of the claims herein.

Bracket 27 throughout the main portion thereof has a series of longitudinally spaced formed depressions 28, 29 and 30, which are preferably of U shape, and which are adapted to receive the loops 26 of bells 24—25 in the same manner as the corresponding depressed portions of Fig. 1, receive loops 26 of said bells.

Having described my invention, reference should now be had to the claims which follow for determining the scope thereof.

I claim:

1. A swing consisting of an inverted T-shaped support adapted to be swingably suspended upon the interior of a bird cage, an elongated wire bracket extending across the bottom of said support, the ends of said bracket being upturned and projected into the horizontally disposed portions of said support, said bracket having a series of longitudinally spaced downwardly extending projections, a series of upright bells and an upwardly extending loop on each bell supportably positioned over each projection whereby said bells are swingably suspended from spaced portions of said bracket.

2. The swing of claim 1, the free ends of said bracket being pointed.

3. The swing of claim 1, said projections being in the form of U-shaped depressions.

4. A swing consisting of an inverted T-shaped support adapted to be swingably suspended upon the interior of a bird cage, an elongated wire bracket extending across the bottom of said support, end portions of said bracket being upturned around the opposite ends of the horizontally disposed portion of said support, the outer ends of said bracket being inturned in spaced aligned relation and projected into the outer ends of said horizontal portion, said bracket having a series of longitudinally spaced downwardly extending depreessions of substantially U-shape, a series of upright bells, and an upwardly extending loop in each bell supportably positioned over each projection whereby said bells are swingably suspended from said bracket.

References Cited in the file of this patent

UNITED STATES PATENTS

| D. 167,326 | Verosub et al. | July 22, 1952 |
| 266,555 | Thorpe | Oct. 24, 1882 |
| 1,123,044 | Warnecke | Dec. 29, 1914 |
| 1,791,175 | Tomlinson | Feb. 3, 1931 |